No. 727,017. PATENTED MAY 5, 1903.
A. G. STEINBRENNER.
ROLLER SIDE BEARING.
APPLICATION FILED DEC. 16, 1902.
NO MODEL. 2 SHEETS—SHEET 2.
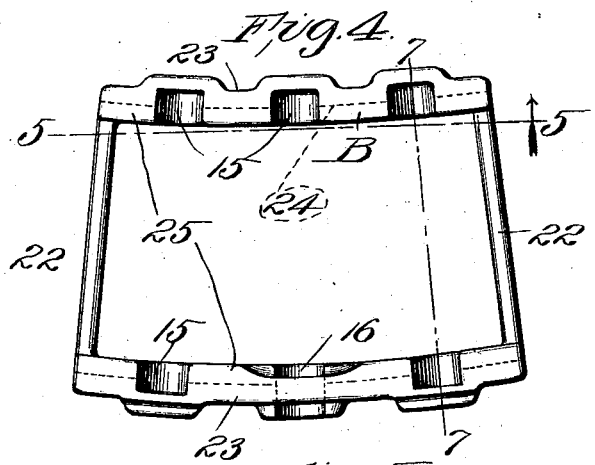
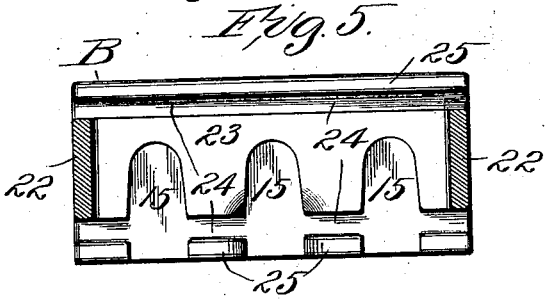
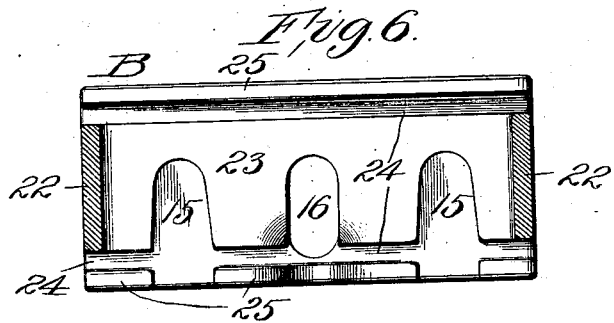
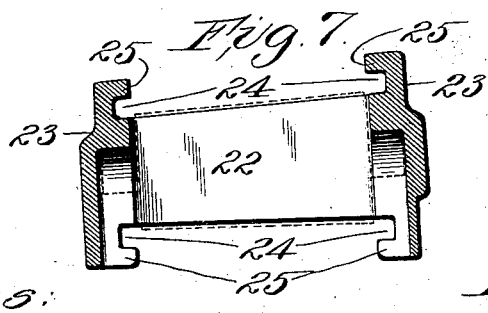
Witnesses. Inventor:
A. G. Steinbrenner,
by Bakewell & Cornwall
attys.

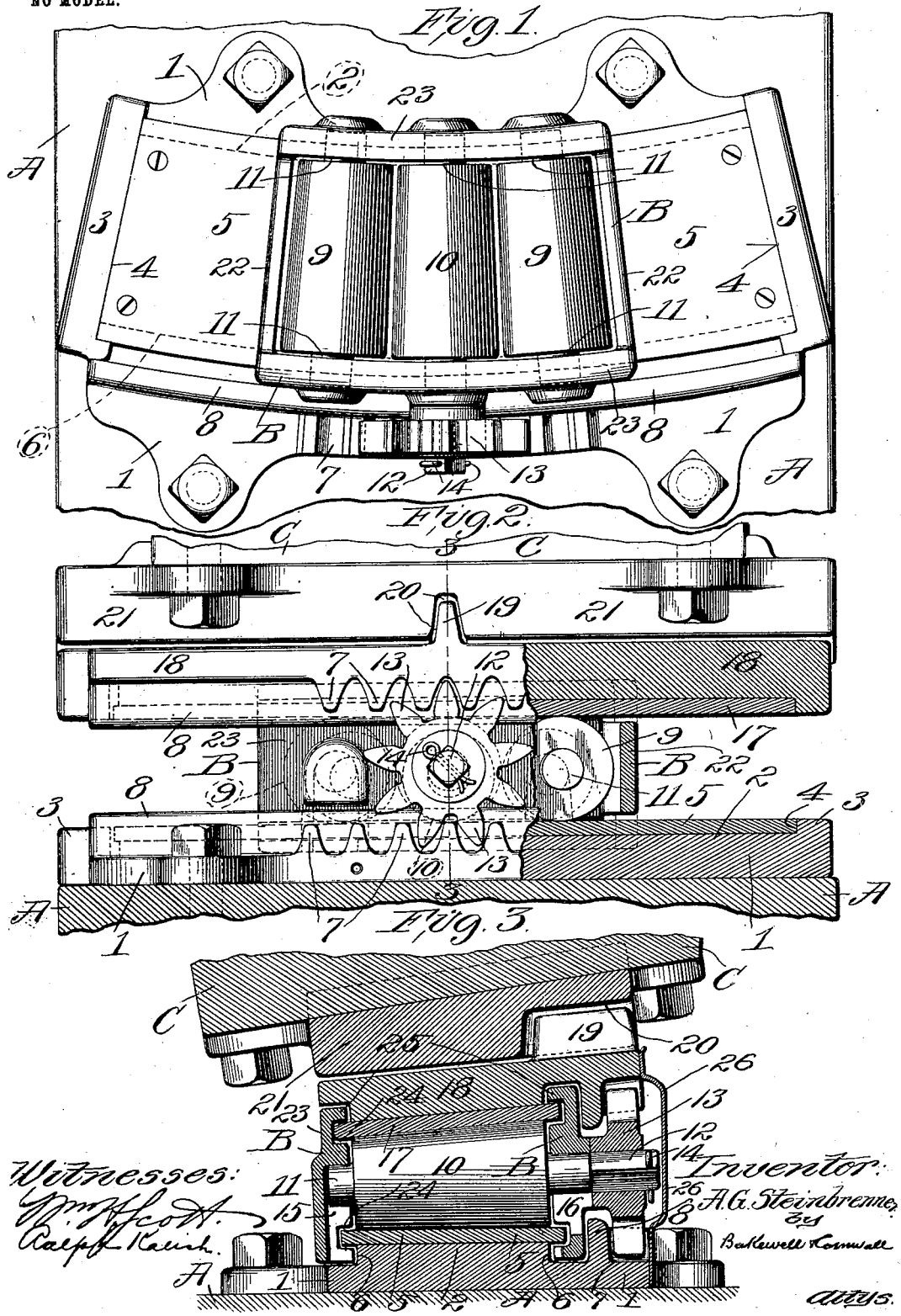

No. 727,017. Patented May 5, 1903.

UNITED STATES PATENT OFFICE.

ANDREW G. STEINBRENNER, OF ST. LOUIS, MISSOURI.

ROLLER SIDE BEARING.

SPECIFICATION forming part of Letters Patent No. 727,017, dated May 5, 1903.

Application filed December 16, 1902. Serial No. 135,385. (No model.)

*To all whom it may concern:*

Be it known that I, ANDREW G. STEINBRENNER, a citizen of the United States, residing at St. Louis, Missouri, have invented a certain new and useful Improvement in Roller Side Bearings, of which the following is a full, clear, and exact description, such as will enable others skilled in the art to which it appertains to make and use the same, reference being had to the accompanying drawings, forming part of this specification, in which—

Figure 1 is a plan view. Fig. 2 is a side elevational view, partly in section. Fig. 3 is a transverse sectional view on the line 3 3 of Fig. 2. Fig. 4 is an inverted plan view of the bearing-frame. Fig. 5 is a sectional view on the line 5 5 of Fig. 4 looking in the direction of the arrow, with the parts shown in their proper operative position. Fig. 6 is a view on the same line looking in the opposite direction, and Fig. 7 is a transverse sectional view on the line 7 7 of Fig. 4.

This invention relates to a new and useful improvement in side bearings designed for use particularly with rolling-stock.

The bearing shown in the accompanying drawings is of that type known as "roller side bearings" and in practice is arranged near the ends of the truck-bolster and on each side of the center plate or bearing, said truck-bolster side bearings coöperating with means on the transom or body-bolster which forms the support for one end of the car.

The object of the invention is to arrange the coöperating parts in such manner that the greatest possible amount of play between the parts is permitted within the limits of safety, whereby the bearing and associated parts will readily adjust themselves to all conditions of practical railway use and at the same time be strong, durable, and economical.

As is well understood, there are two side bearings at each end of the car; but as they are alike in all essential details I will confine my description of details to one bearing, with its correlated parts, in the following description of the invention.

In my bearings I employ a base-plate 1, which is bolted or otherwise secured to the truck-bolster A, so as to be rigidly connected thereto and movable therewith, as in rounding curves, &c. Integral with the base-plate 1 is a central raised portion 2, provided at its ends with flanges 3, which have the angular offsets 4, forming stops for the plate 5. Secured upon the raised portion 2 is a hardened-steel bearing-plate 5, which plate is wider than the portion 2, whereby channels 6 are provided between the lower face of said plate and the upper face of said base-plate 1. On the outer side of plate 1 is a rack 7, formed integral therewith or otherwise, as may be desired, while between said rack 7 and the outer edge of plate 5 is a wall or guard 8. Resting upon the plate 5 are conically-shaped rollers 9 9 and 10, the rollers 9 having trunnions 11 on their ends, while the roller 10 has at one end a trunnion 11, the opposite end terminating in a squared or angular portion 12, upon which latter is slipped the spur-gear 13, which is held in place by the cotter 14, slipped through said portion 12. These trunnions are held within the vertical recesses 15 of the bearing-frame B, all of which recesses are reinforced by an extra thickness of metal thereabout, while the opening 16 extends entirely through the outer wall of said frame, whereby insertion of said central roller is permitted, the angular end being first projected through said opening, after which its trunnion is seated. Bearing upon said rollers 9 and 10 is a wear-plate 17 of the cap-plate 18, said cap-plate and wear-plate being substantially duplicates of the plates 1 and 5, hereinbefore described, and, like the former, forming channels 6 therebetween, while the rack 7 of the cap-plate also meshes with said gear, and the guard 8 is interposed between the upper rack and the bearing-frame. Either integral with the cap-plate 18 or secured thereto in any suitable manner is a vertically-projecting substantially oblong member 19, which rests within a seat or cut-out portion 20, formed in the transom-plate 21, the latter being rigidly bolted to the transom C and there being sufficient clearance between the said member 19 and the walls of said cut-out portion 20 to permit of somewhat free torsional and slight sidewise movement of said member 19 within its socket 20, though excessive movement will be there prevented by reason of the contact of said parts.

Referring now particularly to Figs. 3 and 7, it will be noted that what may be called the "end walls" 22 of the roller-frame—that is, the walls in the line of normal movement thereof—are relatively of less height than are the side walls 23, while said side walls project upwardly and downwardly beyond the end walls and have channels 24 extending longitudinally thereof, into which channels extend the projecting portions of the wear-plates 5 and 17, before mentioned, while the shoulders 25 are guided in said channels 6, before mentioned, whereby the said roller-frame is primarily held down to the lower wear-plate, and the upper wear-plate is so held in contact with the rollers that contact is assured in operation, there being slight vertical clearance in said channels 24, and the said frame is also properly held against lateral shifting on the base-plate 1, while free to travel longitudinally thereover, the cap-plate meanwhile being permitted free longitudinal and slight vertical movement, but is so held that lateral movement thereof is prevented. It will be observed that the recesses 15 extend to the bottom edge of the roller-frame and terminate at a point above the middle portion thereof, whereby the rollers may be inserted from the bottom only.

As shown in the drawings at Fig. 3, a shield 26 is secured to the plate 1 and extends vertically upwardly therefrom, whereby protection is afforded for the gear and racks described; but to permit free passage of air therebetween the shield is left open at its ends, and thus foreign particles, as of dust, are quickly dislodged if they should enter between the shield and said gear. Between the racks and said gear on one side and one of the side walls 23 are the guards 8, cast integral with the base-plate and cap-plate, said guards serving as protectors for the racks, so that sidewise shifting of the bearing-frame is prevented, the thrust being received by said guards 8 in the first instance, whereby a stronger structure is provided.

I am aware that minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. In a side bearing, a base-plate, a cap-plate, wear-plates connected to said plates, and a bearing-frame interlocking with said wear-plates, said frame being movable thereon; substantially as described.

2. In a side bearing, a base-plate, a cap-plate, wear-plates coöperating with each of said plates, a bearing-frame slidably engaging said wear-plates, coned rollers rotatably held in said frame, a rack on said base-plate and cap-plate, a gear on one of said coned rollers engaging said racks, and a shield between said frame and said racks; substantially as described.

3. In a side bearing including a cap-plate, a vertically-projecting member thereon, and a transom-plate coöperating therewith, said transom-plate having a recess in its under portion loosely engaging said cap-plate in such manner as to permit limited movement therebetween; substantially as described.

4. In a side bearing, a base-plate, a cap-plate, racks on said plates, a roller-frame coöperating with said plates and slidable thereon, rollers rotatably mounted in said frame, a gear on one of said rollers meshing with said racks, and means for preventing lateral thrust of said roller-frame against said racks; substantially as described.

5. In a side bearing, a base-plate, a roller-frame slidably connected therewith, rollers in said frame, a gear on one of said rollers projecting beyond said frame, a rack on said base-plate, and means between said rack and frame for preventing lateral shifting of said frame against said rack; substantially as described.

6. In a side bearing, a base-plate, a cap-plate, an upwardly-projecting member on said cap-plate, extending transversely thereof for a portion of the width of said cap-plate, and a transom-plate provided with a recess in its under face in coincidence with said member, said recess being of such capacity as to permit limited movement of said transom-plate with relation to said cap-plate; substantially as described.

7. In a side bearing, a base-plate, a cap-plate, an upwardly-projecting member extending transversely of, and integral with said cap-plate, and a transom-plate provided with a recess in its under face in coincidence with said member, said recess being of such capacity as to permit limited movement of said transom-plate with relation to said cap-plate; substantially as described.

8. In a side bearing, a base-plate, a cap-plate, an upwardly-projecting member on said cap-plate, and a transom-plate provided with a recess in its under face in coincidence with said member, said recess being of such capacity as to permit limited torsional play of said transom-plate with relation to said cap-plate; substantially as described.

9. In a side bearing, a base-plate, a wear-plate forming a projecting ledge above the same, a roller-frame slidably engaging with said ledge, rollers in said frame, a gear on one of said rollers, a rack on said base-plate coöperating with said gear, and a guard outside of said gear adapted to protect the same but left open at its ends to permit free passage of air-currents whereby foreign particles are swept away; substantially as described.

10. In a side bearing, a top and bottom wear-plate, conically-shaped rollers, and a roller-frame with recesses formed in its vertical side walls for trunnions on said rollers and extending above the upper wear-plate, channels being formed in said side walls whereby said frame is guided by said wear-plate in its movement; substantially as described.

11. In a side bearing, a base-plate, a relatively narrower wear-plate support integral therewith, a wear-plate thereon whose edges extend laterally beyond the sides of its support, a roller-frame extending vertically beyond said wear-plate and having a plurality of recesses formed in its vertical walls, rollers mounted on said wear-plate having trunnions rotatable in said recesses, and a movable bearing member contacting with said rollers above the same, said bearing member being held against lateral displacement by extensions of the side walls of the roller-frame; substantially as described.

12. In a side bearing, a base-plate, a wear-plate removably connected thereto, a roller-frame mounted upon said wear-plate, said frame having recesses formed in its inner side faces, rollers therein having trunnions rotatably held in said recesses, a movable member bearing on said rollers and interlocked with the roller-frame, a rack on said member, and a pinion movable with one of said rollers meshing with said rack; substantially as described.

13. In a side bearing, a base-plate, a wear-plate thereon, a cap-plate, a wear-plate coöperating therewith, a roller-frame interlocking with said wear-plates and movable longitudinally thereof, a rack on said base-plate, rollers within said frame, one of which projects therebeyond, a gear on said projecting roller, and a guard between said rack and said roller-frame; substantially as described.

14. In a side bearing, a base-plate, a wear-plate thereon, a cap-plate, a wear-plate connected thereto, a roller-frame interlocking with said wear-plates and movable longitudinally thereof, and conically-shaped rollers with trunnions rotatable in recesses formed in the inner face of said frame, said rollers being of less diameter than the height of the side walls of said roller-frame; substantially as described.

In testimony whereof I hereunto affix my signature, in the presence of two witnesses, this 9th day of December, 1902.

ANDREW G. STEINBRENNER.

Witnesses:
  GEORGE BAKEWELL,
  F. H. GIBBS.